US012037922B2

(12) United States Patent
Moradi et al.

(10) Patent No.: US 12,037,922 B2
(45) Date of Patent: Jul. 16, 2024

(54) TURBOMACHINE BLADE HAVING A METALLIC LEADING EDGE

(71) Applicant: SAFRAN AIRCRAFT ENGINES, Paris (FR)

(72) Inventors: Azalia Moradi, Moissy-Cramayel (FR); Bassem Ben Belgacem, Moissy-Cramayel (FR); Célia Iglesias Cano, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/009,881

(22) PCT Filed: Jun. 15, 2021

(86) PCT No.: PCT/FR2021/051067
§ 371 (c)(1),
(2) Date: Dec. 12, 2022

(87) PCT Pub. No.: WO2021/255378
PCT Pub. Date: Dec. 23, 2021

(65) Prior Publication Data
US 2023/0258093 A1    Aug. 17, 2023

(30) Foreign Application Priority Data

Jun. 18, 2020 (FR) .................................. 2006378
Jun. 25, 2020 (FR) .................................. 2006676

(51) Int. Cl.
*F01D 5/28* (2006.01)
*B29C 70/22* (2006.01)
(Continued)

(52) U.S. Cl.
CPC ............ *F01D 5/282* (2013.01); *B29C 70/222* (2013.01); *B29C 70/34* (2013.01); *B29C 70/86* (2013.01);
(Continued)

(58) Field of Classification Search
CPC ..... B29D 99/0025; F01D 5/286; F01D 5/282; F01D 5/005; F01D 5/147; F04D 29/322;
(Continued)

(56) References Cited

U.S. PATENT DOCUMENTS 6,537,413 B1* 3/2003 Hochet .................. B32B 5/26
428/116
2011/0038732 A1    2/2011 Huth et al.

FOREIGN PATENT DOCUMENTS

EP    2 037 082 A1    3/2009
FR    3 040 909 A1    3/2017
(Continued)

OTHER PUBLICATIONS

JR International Search Report as issued in International Patent Application No. PCT/FR2021/051067, dated Sep. 28, 2021.

*Primary Examiner* — Jacob M Amick
*Assistant Examiner* — Charles J Brauch
(74) *Attorney, Agent, or Firm* — Pillsbury Winthrop Shaw Pittman LLP

(57) ABSTRACT

A turbomachine blade includes a blading made of composite material with a fibrous reinforcement densified by a matrix and a metal leading edge formed by a metal foil, the foil having an intrados fin and an extrados fin which extend respectively over intrados and extrados faces of the blading by conforming to an airfoil of the blade, wherein the blade also includes at least one unidirectional fabric ply made of composite material on the leading edge between the blading and the metal foil, each unidirectional fabric ply extending (Continued)

at least partially over the intrados and extrados faces of the blading.

20 Claims, 3 Drawing Sheets

(51) Int. Cl.
| | |
|---|---|
| *B29C 70/34* | (2006.01) |
| *B29C 70/86* | (2006.01) |
| *B29K 307/04* | (2006.01) |
| *B29K 705/00* | (2006.01) |
| *B29L 31/08* | (2006.01) |
| *F01D 5/00* | (2006.01) |
| *F01D 5/14* | (2006.01) |

(52) U.S. Cl.
CPC ............. *F01D 5/005* (2013.01); *F01D 5/147* (2013.01); *B29K 2307/04* (2013.01); *B29K 2705/00* (2013.01); *B29L 2031/082* (2013.01); *F05D 2220/32* (2013.01); *F05D 2230/23* (2013.01); *F05D 2230/80* (2013.01); *F05D 2240/30* (2013.01)

(58) Field of Classification Search
CPC ..... F04D 29/324; B29C 70/48; B29C 70/222; B29C 70/34; B29C 70/86; B29C 70/24; B29C 65/00; B29C 70/20; B29C 73/10; F05D 2220/36; F05D 2230/40; F05D 2240/303; F05D 2300/603; F05D 2300/6034; F05D 2220/32; F05D 2230/23; F05D 2230/80; F05D 2240/30; B29K 2307/04; B29K 2705/00; B29L 2031/082; B29L 2031/08; B29L 2031/7504; Y02T 50/60
See application file for complete search history.

(56) References Cited

FOREIGN PATENT DOCUMENTS

| | | | |
|---|---|---|---|
| WO | WO 2019/186029 A1 | 10/2019 | |
| WO | WO-2019186029 A1 * | 10/2019 | ......... B29C 65/4835 |

* cited by examiner

[Fig. 1]
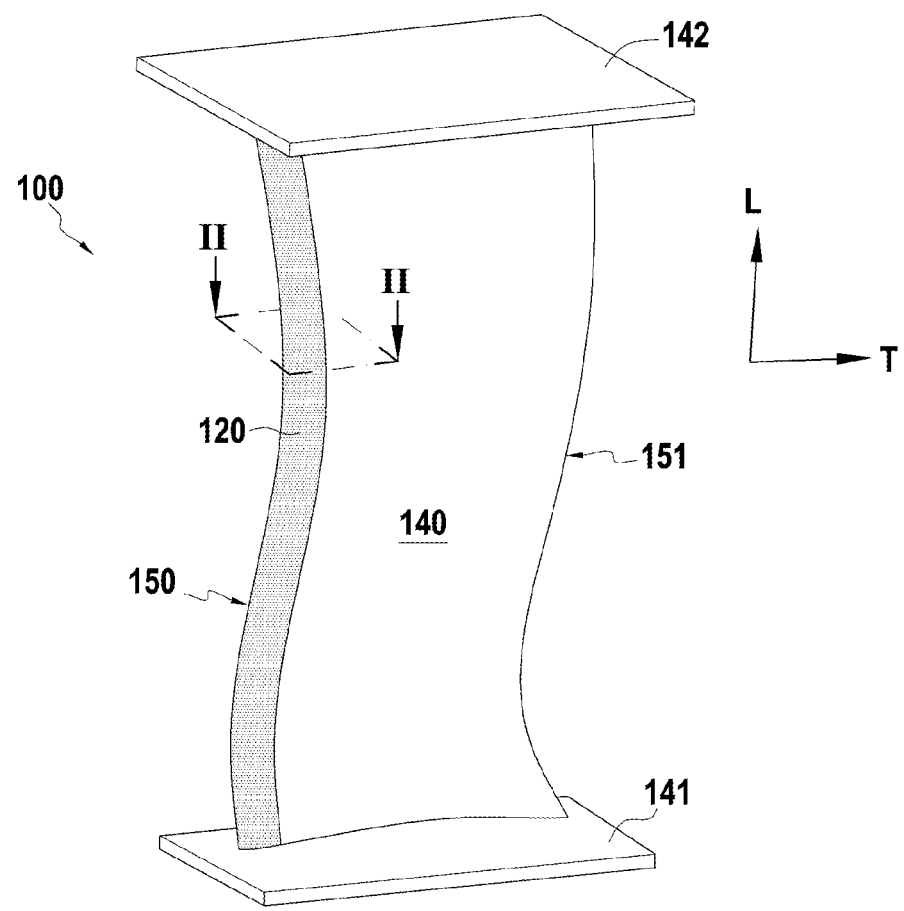

[Fig. 2]
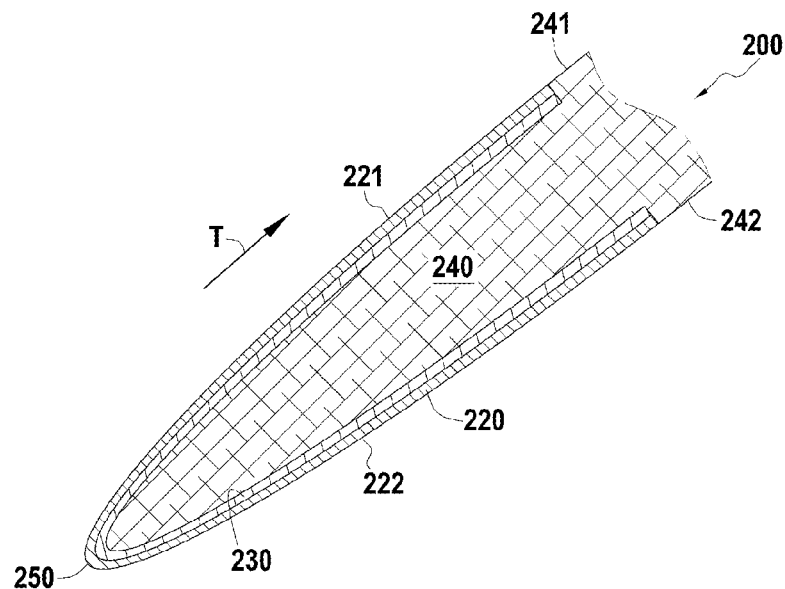
[Fig. 3]
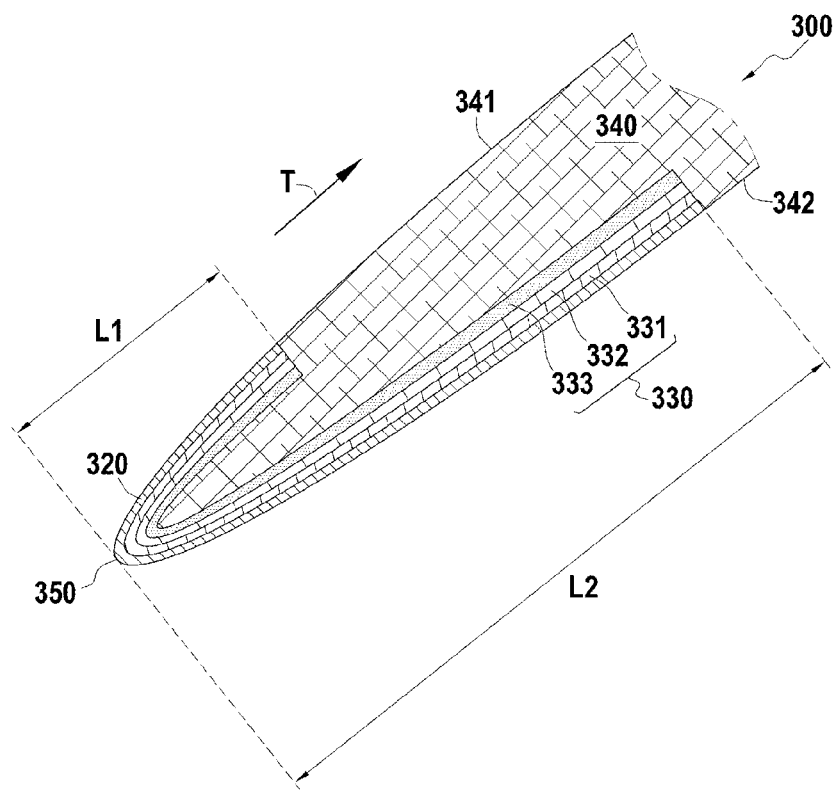

[Fig. 4]
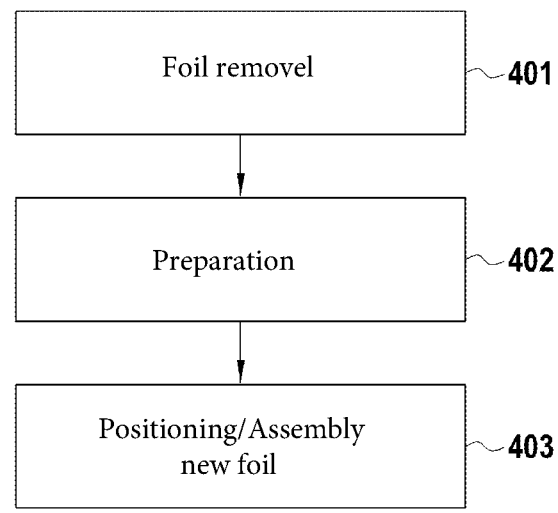

TURBOMACHINE BLADE HAVING A METALLIC LEADING EDGE

CROSS-REFERENCE TO RELATED APPLICATIONS

This application is the U.S. National Stage of PCT/FR2021/051067, filed Jun. 15, 2021, which in turn claims priority to French patent application number 20 06378 filed Jun. 18, 2020 and French patent application number 20 06676 filed Jun. 25, 2020. The content of these applications are incorporated herein by reference in their entireties.

TECHNICAL FIELD

The present invention relates to the general field of blades for aeronautical gas turbine engines or aeronautical turbomachines made of composite material and more particularly to turbomachine blades with a metal leading edge.

PRIOR ART

In order to protect the composite blading of a blade from abrasion, erosion and/or impacts with a foreign body, the blades comprise a reinforced leading edge, and more particularly a one-piece leading edge made of titanium.

This titanium leading edge is assembled by bonding on the blading. Nevertheless, this type of leading edge incurs significant material and manufacturing costs as well as non-compliances throughout its lifecycle.

Indeed, the cost of the titanium material is high, and the manufacture of the blade entails many steps as well as material scraps. Moreover, during the assembly of the titanium leading edge on the blading, the surface of the blading must be prepared before bonding the leading edge and the latter requires a prior passage in a long autoclave cycle. It is also necessary to adapt the cavity of the blading receiving the leading edge which is very often too wide or too narrow, which leads to corrugations and/or striations at the level of the fins of the blading.

During the manufacture of intermediate parts for making a blade comprising such a leading edge, non-compliances on the part at the start of mounting can also be observed, whereas the intermediate part (titanium leading edge) was compliant.

It is also difficult to repair such a damaged leading edge without changing the entire leading edge.

It is therefore desired to have an aeronautical turbomachine blade that is less expensive during its manufacture and maintenance and that is more easily repairable.

DISCLOSURE OF THE INVENTION

The invention relates to a turbomachine blade comprising a blading made of composite material with a fibrous reinforcement densified by a matrix and a metal leading edge formed by a metal foil, the foil having an intrados fin and an extrados fin which extend respectively over intrados and extrados faces of the blading by conforming to an airfoil of the blade, characterized in that the blade also comprises at least one unidirectional fabric ply made of composite material on the leading edge between the blading and the metal foil, each fabric ply extending at least partially over the intrados and extrados faces of the blading.

Such a leading edge can be easily assembled on the blading and repaired without touching or damaging the composite structure of the blading, because it suffices to replace the damaged and/or non-compliant foil with another foil that will only be in contact with the unidirectional fabric plies. Moreover, the leading edge of the invention allows designing, producing and repairing the blade at a lower cost. Indeed, the metal foil has a thickness much smaller than that of a one-piece titanium leading edge, the costs of the material are therefore reduced during the manufacture or during the repair of the blade.

It is also easier to adapt to particular blade geometry constraints with this type of leading edge, such as the reinforcement of one of the faces of the blade by extending the metal foil on the intrados or extrados face of the blading without modifying the inner structure of the blading.

According to one embodiment of the invention, the metal foil extends over a first length on the intrados face of the blading and over a second length on the extrados face of the blading.

This allows designing a blade whose metal reinforcement provided by the foil extends over a greater length on the intrados (or extrados) face compared to the extrados (or intrados) face of the blading.

According to another embodiment of the invention, the first and second lengths are equal.

This allows obtaining a leading edge symmetrical with respect to an axis connecting the leading edge and the trailing edge of the blade.

According to one particular characteristic of the invention, each unidirectional fabric ply extends over an entire inner surface of the intrados and extrados fins of the foil.

This allows not having direct contact between the metal foil and the blading. Thus, the replacement of the metal foil will be simplified, because it will not affect the inner structure of the blading and there will be no need to prepare the surface of the blading before laying the new foil.

According to one embodiment of the invention, the blade comprises a plurality of unidirectional fabric plies made of composite material on the leading edge between the metal foil and the blading, the plies of the plurality of fabric plies being draped over each other and extending at least partially over the intrados and extrados faces of the blading.

The unidirectional fabric plies allow protecting the inner structure of the blading in case of damage to the leading edge and of replacement of the metal foil. Moreover, since the plies are draped over each other, the corrugation or striation phenomena that may occur between the plies of the plurality of plies during the manufacture, use or repair of the blade are avoided.

According to one particular characteristic of the invention, an adhesive film is present between said at least one unidirectional fabric ply and the metal foil.

According to another particular characteristic of the invention, once the draping of the unidirectional fabric plies has been carried out, the metal foil and the rest of the blading are co-injected.

According to another particular characteristic of the invention, an adhesive film is present between said at least one unidirectional fabric ply and the blading.

These different characteristics (adhesive film, co-injection and draping) allow holding in place the metal foil on the unidirectional fabric plies, and holding in place the unidirectional plies on the blading.

According to another particular characteristic of the invention, the composite material of each unidirectional fabric ply comprises Kevlar fibers.

According to another particular characteristic of the invention, the blading is a three-dimensional part woven with glass fibers, the weaving can be partial or total.

According to another particular characteristic of the invention, the metal foil has a thickness comprised between 0.1 mm and 0.5 mm on the intrados and extrados faces.

According to another particular characteristic of the invention, said at least one unidirectional fabric ply has a thickness comprised between 0.15 mm and 0.25 mm.

According to another particular characteristic of the invention, the set of unidirectional fabric plies has a thickness comprised between 0.2 mm and 1 mm.

According to another particular characteristic of the invention, the blade constitutes an outlet guide vane, an inlet guide vane, a fan blade or a variable-pitch blade.

Another object of the invention is a method for repairing a turbomachine blade according to the invention, comprising the removal of the metal foil, the preparation of a surface of a new metal foil and the positioning of said new metal foil on the at least one unidirectional fabric ply.

BRIEF DESCRIPTION OF THE DRAWINGS

Other characteristics and advantages of the present invention will become apparent from the description given below, with reference to the appended drawings which illustrate exemplary embodiments thereof without limitation.

FIG. 1 schematically and partially represents a view of a blade according to one embodiment of the invention.

FIG. 2 schematically and partially represents a cross-sectional view of a blade according to one embodiment of the invention.

FIG. 3 schematically and partially represents a cross-sectional view of a blade according to one embodiment of the invention.

FIG. 4 represents a flowchart showing the different steps of a blade repair method according to one embodiment of the invention.

DESCRIPTION OF THE EMBODIMENTS

The blade represented in FIGS. 1 to 3 can for example be a fixed blading or a flow straightener.

FIG. 1 schematically and partially represents a blade 100 according to the invention. The blade 100 comprises a blading 140 which extends along a longitudinal direction L, corresponding to a radial direction when the blade 100 is mounted in a turbomachine, between an inner platform 141 and an outer platform 142. The blading 140 extends along a transverse direction T between a leading edge 150 and a trailing edge 151.

The blading 140 is made of three-dimensional composite material, and more particularly of composite material with a fibrous reinforcement densified by a matrix. The fibrous reinforcement can comprise carbon fibers, and the matrix can be of the organic type and obtained from a densification resin. Alternatively, the fibrous reinforcement can comprise woven glass fibers.

The leading edge 150 of the blading 140 is covered by a metal foil 120 placed on the blading 140 by conforming to an airfoil of the blading 140.

At least one unidirectional fabric ply made of composite material (not represented in FIG. 1) is placed between the blading 140 and the foil 120 on the leading edge 150.

FIG. 2 schematically and partially represents a cross-sectional view of the blading 240 of a blade 200, along the plane II of FIG. 1, according to one embodiment of the invention.

The metal foil 220 comprises an intrados fin 221 and an extrados fin 222 which respectively extend over part of the intrados face 241 and part of the extrados face 242 of the blading 240. The fins 221 and 222 are integrated into the blading 240 so that they conform to the airfoil of the blade 200 by defining part of this airfoil.

According to the invention, the blade 200 also comprises at least one unidirectional fabric ply made of composite material 230 placed between the metal foil 220 and the blading 240. In the example of FIG. 2, a single ply 230 is represented. This fabric ply 230 allows not having a direct contact between the foil 220 and the fibrous structure of the blading 240.

In the example of FIG. 2, the foil 220 and the fabric ply 230 extend over the same length on the intrados face 241 and on the extrados face 242 of the blading 240. The fabric ply 230 therefore extends over the entire inner surface of the intrados 221 and extrados 222 fins of the foil 220. The foil 220 is also symmetrical with respect to an axis extending between the leading edge 250 and the trailing edge of the blade 200.

The fabric ply 230 has a thickness comprised between 0.15 mm and 0.25 mm. The metal foil 220 has a thickness comprised between 0.1 mm and 0.5 mm.

FIG. 3 schematically and partially represents a sectional view of the blading 340 of a blade 300 according to another embodiment of the invention.

The metal foil 320 always comprises an intrados fin and an extrados fin which extend respectively over part of the intrados face 341 and part of the extrados face 342 of the blading 340. The fins are always integrated into the blading 340 so as to conform to the airfoil of the blade 300.

In the example represented, the blade 300 comprises a plurality of unidirectional fabric plies 330. Particularly, the example of FIG. 3 comprises three plies 331, 332 and 333. The plies 331, 332 and 333 are draped over each other. The draping can for example be made from single unidirectional plies pre-impregnated with an epoxy resin.

In this example, the foil 320 extends over a first length L1 on the intrados face 341 of the blading 340 and over a second length L2 on the extrados face 342 of the blading 340. The foil 320 is therefore asymmetrical with respect to the axis extending between the leading edge 350 and the trailing edge of the blade 300. In this example, the plies 331, 332, 333 extend over the same lengths L1 and L2 on the intrados 341 and extrados 342 faces of the blading 300. But they can also extend over lengths greater than L1 for the intrados face 341 and greater than L2 for the extrados face 342 of the blading 340, which allows protecting the blading 340 during the assembly and/or removal of the foil 320 during the manufacture or repair of the blade 300. The lengths L1 and L2 can also vary over the height of blade 300 and be reversed in terms of proportions, that is to say L1 can be greater than L2 and vice versa.

The plurality of plies 330 has for example a thickness comprised between 0.2 mm and 1 mm, and the metal foil 320 between 0.1 mm and 0.5 mm.

Regardless of the embodiment, in order to fix the foil on the blading, an adhesive film can also be present between the metal foil and the unidirectional fabric plies.

Regardless of the embodiment, in order to fix the foil on the blading, the metal foil can be co-fired with the blading comprising the blading and the unidirectional fabric plies after draping the fabric plies.

Regardless of the embodiment, in order to fix the fabric plies on the blading, the plies which are pre-impregnated with a resin can be draped together. During firing, the resin of the pre-impregnated plies will polymerize and cure.

Regardless of the embodiment of the invention, the material forming the metal foil can comprise an alloy of titanium and/or aluminum.

Regardless of the embodiment of the invention, the composite material of the unidirectional fabric plies comprises Kevlar fibers. The advantage of Kevlar is to have a high resistance to impact, which allows protecting the blade, for example in the event of impact with birds.

Regardless of the embodiment of the invention, the blading can be a three-dimensional part that can be derived from a three-dimensional fiber weaving. It can for example be woven from organic fibers, such as carbon fibers, or from glass fibers. The fibers are then densified by a matrix which can be of the organic type.

Regardless of the embodiment, the blade can constitute an outlet guide vane, an inlet guide vane, a fan blade or a variable—pitch blade. And more particularly, the blade can constitute any fan blade at the level of the low-pressure compressor of a turbomachine.

The invention also relates to a method for repairing a blade according to the invention. FIG. 4 shows the different steps of an example of a repair method according to the invention.

The first step 401 of the method consists in removing the metal foil from the blade. This foil can for example be damaged following the use of the blade. To remove the foil, it can for example be peeled.

In a second step 402, the surface of the new metal foil is prepared.

In a third step 403, a new foil is positioned and assembled on the leading edge of the blade. The new foil can be assembled on the unidirectional fabric plies by bonding or by co-firing of the new foil, the fabric plies and the blading. The co-firing is for example carried out in an autoclave so that the resin polymerizes throughout the part.

The expression "comprised between . . . and . . . " must be understood as including the bounds.

The invention claimed is:

1. A turbomachine blade comprising a blading made of composite material with a fibrous reinforcement densified by a matrix and a metal leading edge formed by a metal foil, the foil having an intrados fin and an extrados fin which extend respectively over intrados and extrados faces of the blading by conforming to an airfoil of the blade, wherein the blade also comprises at least one unidirectional fabric ply made of composite material on the leading edge between the blading and the metal foil, each fabric ply extending at least partially over the intrados and extrados faces of the blading, such that, a replacement of the foil may be performed by removing the metal foil by peeling;
preparing a surface of new metal foil; and
positioning said new metal foil on the at least one unidirectional fabric ply without preparing a surface of the blading on which the foil is positioned.

2. The turbomachine blade according to claim 1, wherein the metal foil extends over a first length on the intrados face of the blading and over a second length on the extrados face of the blading.

3. The turbomachine blade according to claim 2, wherein the first and second lengths are equal.

4. The turbomachine blade according to claim 1, wherein each unidirectional fabric ply extends over an entire inner surface of the intrados and extrados fins of the foil.

5. The turbomachine blade according to claim 1, wherein the blade comprises a plurality of unidirectional fabric plies made of composite material on the leading edge between the metal foil and the blading, the plies of the plurality of fabric plies being draped over each other and extending over the intrados and extrados faces of the blading by conforming to the airfoil of the blade.

6. The turbomachine blade according to claim 1, wherein an adhesive film is present between said at least one unidirectional fabric ply and the metal foil.

7. The turbomachine blade according to claim 1, wherein the metal foil has a thickness comprised between 0.1 mm and 0.5 mm on the intrados and extrados faces.

8. The turbomachine blade according to claim 1, wherein said at least one unidirectional fabric ply has a thickness comprised between 0.15 mm and 0.25 mm.

9. The turbomachine blade according to claim 1, constituting an outlet guide vane, an inlet guide vane, a fan blade or a variable-pitch blade.

10. A method for repairing a turbomachine blade, comprising a blading made of composite material with a fibrous reinforcement densified by a matric and a metal leading edge formed by a metal foil, the foil having an intrados and an extrados fin which extend respectively over intrados and extrados faces of the blading by conforming to an airfoil of the blade, wherein the blade comprises at least one unidirectional fabric ply made of composite material on the leading edge between the blading and the metal foil, each fabric ply extending at least partially over the intrados and extrados faces of the blading, the method comprising:
removing the metal foil by peeling;
preparing a surface of new metal foil; and
positioning said new metal foil on the at least one unidirectional fabric ply without preparing a surface of the blading on which the foil is positioned.

11. The method according to claim 10, wherein the metal foil extends over a first length on the intrados face of the blading and over a second length on the extrados face of the blading.

12. The method according to claim 11, wherein the first and second lengths are equal.

13. The method according to claim 10, wherein each unidirectional fabric ply extends over an entire inner surface of the intrados and extrados fins of the foil.

14. The method according to claim 10, wherein the blade comprises a plurality of unidirectional fabric plies made of composite material on the leading edge between the metal foil and the blading, the plies of the plurality of fabric plies being draped over each other and extending over the intrados and extrados faces of the blading by conforming to the airfoil of the blade.

15. The method according to claim 10, wherein an adhesive film is present between said at least one unidirectional fabric ply and the metal foil.

16. The method according to claim 10, wherein the metal foil has a thickness between 0.1 mm and 0.5 mm on the intrados and extrados faces.

17. The method according to claim 10, wherein said at least one unidirectional fabric ply has a thickness between 0.15 mm and 0.25 mm.

18. The method according to claim 10, wherein the turbomachine comprises a part selected from the group consisting of: an outlet guide vane, an inlet guide vane, a fan blade, and a variable-pitch blade.

19. The turbomachine blade according to claim 5, wherein the metal foil extends over a first length on the intrados face of the blading and over a second, different, longer length on the extrados face of the blading and wherein the plurality of unidirectional fabric plies extend over lengths greater than the first length for the intrados face and greater than the second face for the extrados face of the blading.

20. The turbomachine blade according to claim 5, wherein the metal foil extends over a first length on the intrados face of the blading and over a second, different, longer length on the extrados face of the blading and wherein the plurality of unidirectional fabric plies extend over a equal to the first length for the intrados face and equal to the second face for the extrados face of the blading.

\* \* \* \* \*